United States Patent [19]

Weder

[11] Patent Number: 5,412,906
[45] Date of Patent: May 9, 1995

[54] WRAPPING APPARATUS HAVING SPRINGABLE BASE

[75] Inventor: Donald E. Weder, Highland, Ill.

[73] Assignee: Highland Supply Corporation, Highland, Ill.

[21] Appl. No.: 123,506

[22] Filed: Sep. 17, 1993

Related U.S. Application Data

[63] Continuation-in-part of Ser. No. 979,494, Nov. 19, 1992, Pat. No. 5,373,942.

[51] Int. Cl.$^6$ ............................................. A01G 9/02
[52] U.S. Cl. ........................................ 47/72; 220/737; 220/408; 383/33
[58] Field of Search ............... 220/737, 408; 383/34.1, 383/33; 47/72

[56] References Cited

U.S. PATENT DOCUMENTS

| | | | |
|---|---|---|---|
| 1,087,702 | 2/1914 | Van Patten | 383/33 |
| 1,159,491 | 11/1915 | Abraham | 220/737 |
| 2,009,511 | 7/1935 | Nydegger | 229/87.01 |
| 2,215,411 | 9/1940 | Sebring | 220/737 |
| 3,271,922 | 9/1966 | Wallerstein et al. | 53/399 |
| 3,712,463 | 1/1973 | Bestehorn | 206/232 |
| 4,300,312 | 11/1981 | Weder | 47/72 |
| 4,333,267 | 6/1982 | Witte | 206/423 |
| 4,801,014 | 1/1989 | Meadows | 206/423 |
| 4,989,396 | 2/1991 | Weder et al. | 53/399 |
| 5,007,229 | 4/1991 | Weder et al. | 53/461 |
| 5,181,364 | 1/1993 | Weder | 53/465 |

FOREIGN PATENT DOCUMENTS 2589436 5/1987 France ................................ 47/72

OTHER PUBLICATIONS

Exhibit A "Speed Sheet" Brochure, Copyrighted 1990.
Exhibit B "Wrist Wrap" Copy of Sample Product.

*Primary Examiner*—Henry E. Raduazo
*Attorney, Agent, or Firm*—Dunlap & Codding

[57] ABSTRACT

A wrapping apparatus having a springable base with attached arms which support a wrapping material. The spaced apart arms extend upward and outward from the perimeter of the springable base, which is flexible to assume an arched posture and a flat posture. In response to downward pressure on a central area of the springable base, the springable base snaps from the arched posture into the flat posture. When the springable base is in the arched posture, the arms and wrapping material are in an open position to receive an item to be wrapped. The arms and wrapping material move into a closed position when the springable base assumes the flat posture. The wrapping apparatus may be constructed with or without an upper skirt of wrapping material. The wrapping material may be inside the arms, outside the arms or may envelope the arms.

20 Claims, 4 Drawing Sheets

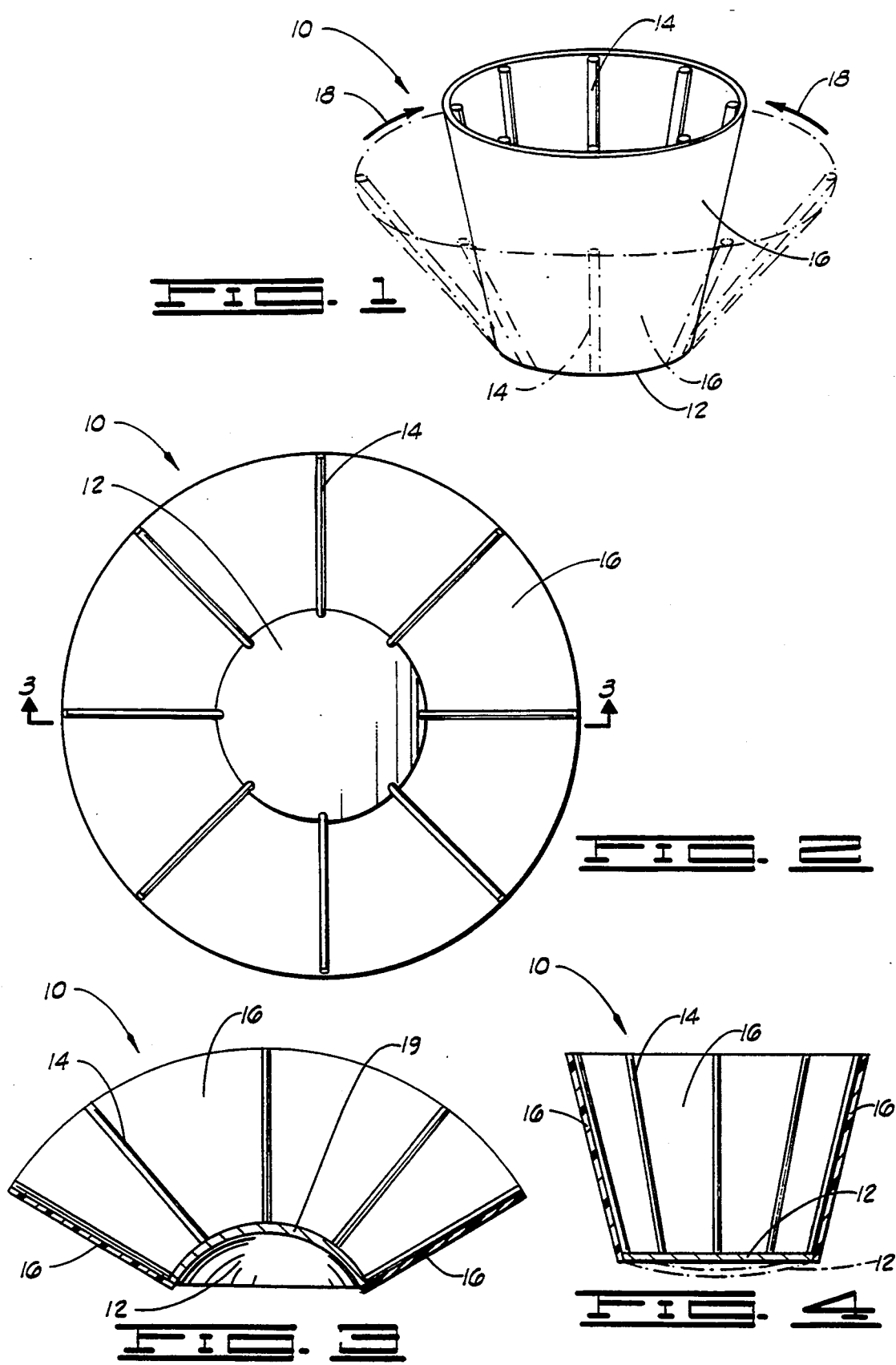

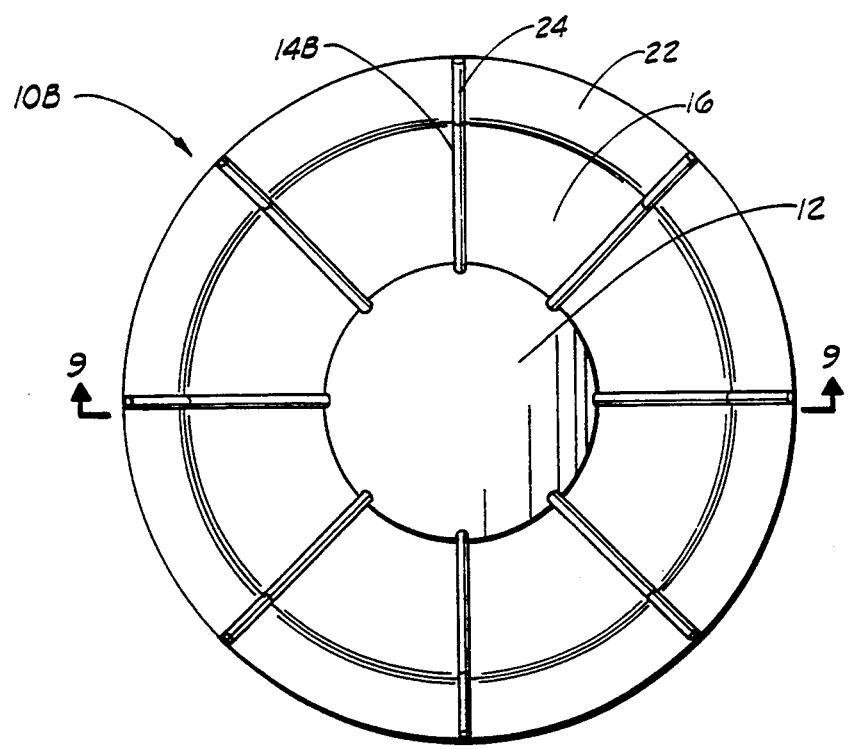
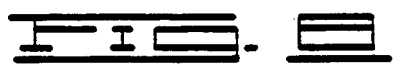
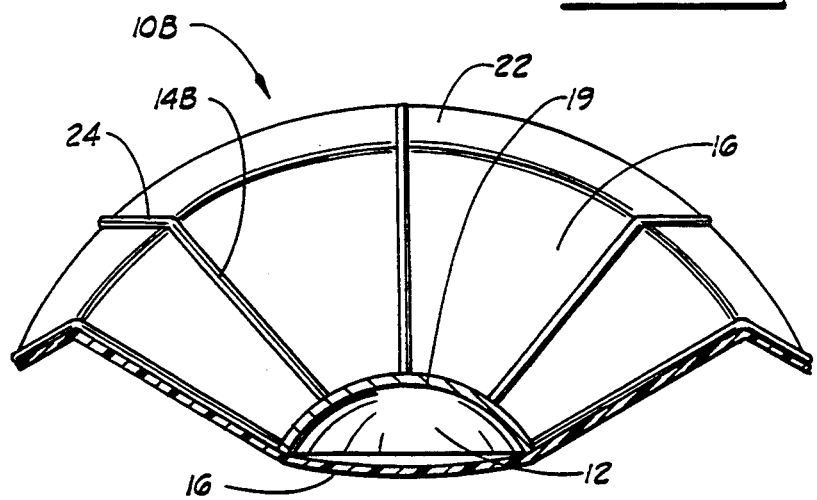
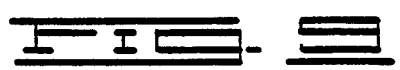
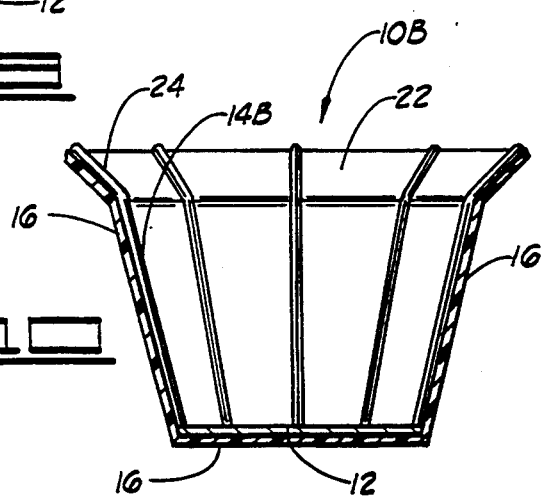
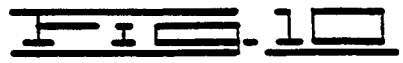

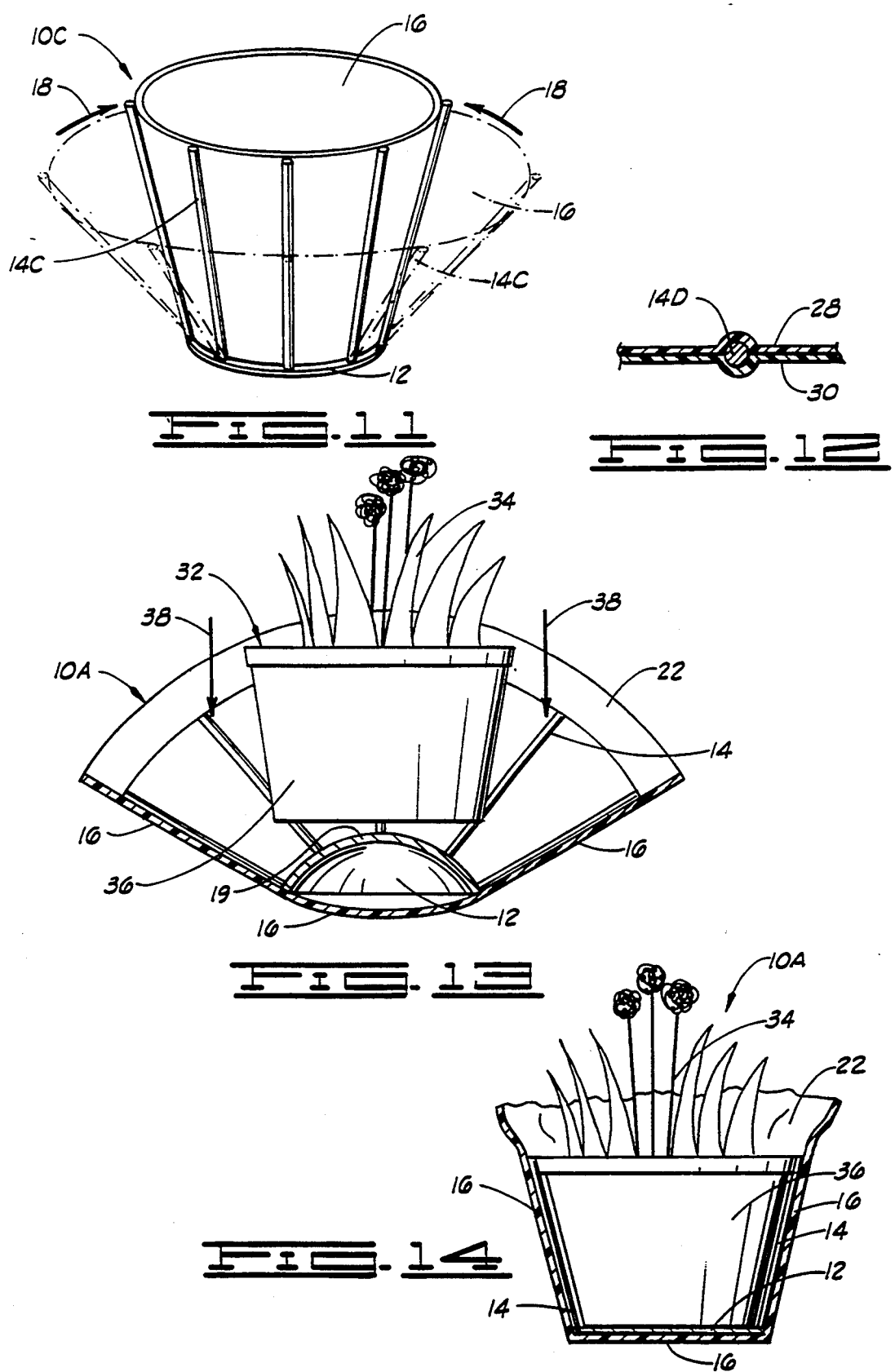

WRAPPING APPARATUS HAVING SPRINGABLE BASE

CROSS-REFERENCE TO RELATED APPLICATIONS

This application is a continuation-in-part of U.S. Ser. No. 979,494, filed Nov. 19, 1992, now U.S. Pat. No. 5,373,942, entitled "Spring Strip Wrapping and Method for Using Same."

BACKGROUND OF THE INVENTION

1. Field of the Invention

The present invention relates generally to materials for wrapping items, and particularly, but not by way of limitation, to an apparatus for wrapping a flower pot.

2. Description of Related Art

U.S. Pat. No. 2,209,778 issued to Krasowski discloses a decorative covering for flower pots which has an ordinary saucer as its base. The covering is wrapped around a flower pot and secured with hooks and eyes. Upper and lower adhesive binding strips hold the covering to the flower pot and the saucer.

A wrap for a flower pot is also disclosed in U.S. Pat. No. 4,980,209 issued to Hill. This wrap is secured to the flower pot by inner and outer rings which mate together with the wrap between them.

These coverings and wraps require substantial manual intervention in order to apply them to a flower pot. In the case of the Krasowski patent, the covering must be wrapped around the flower pot and the saucer, the hooks and eyes must be fastened, and the adhesive binding strips must be pressed against the flower pot and the saucer.

With regard to the Hill patent, the inner ring must be attached to the flower pot, the flower pot must be placed inside the wrap, and the outer ring must be positioned around the wrap and locked with the inner ring.

SUMMARY OF THE INVENTION

The present invention is a wrapping apparatus which virtually wraps itself around a floral grouping, a plant or any other item. The wrapping apparatus includes a springable base, a plurality of arms and a wrapping material.

The arms are spaced apart and extend outward and upward from the perimeter of the springable base. The wrapping material is secured to and supported by the arms. The springable base is adapted to maintain two postures, an arched or concave posture and a substantially flat or convex posture.

In the arched posture, the springable base supports the arms and the wrapping material in an open position to receive a floral grouping. In a substantially flat posture, the springable base tilts the arms inward into a wrapped position.

The springable base is adapted to snap from the arched posture to the flat posture in response to pressure on its upper surface. By placing a floral grouping on the springable base in the arched posture, the springable base snaps into the flat posture, tilting the arms inward to draw the wrapping material around the floral grouping.

One object of the present invention is to provide a wrapping apparatus which may assume an open position to receive a floral grouping or other item.

Another object of the present invention is to provide a wrapping apparatus which requires little manual intervention in order to be wrapped around a floral grouping or other item.

Other objects, features and advantages of the present invention are apparent from the following detailed description when read in conjunction with the accompanying drawings and appended claims.

BRIEF DESCRIPTION OF THE DRAWINGS

FIG. 1 is a perspective view of a wrapping apparatus constructed in accordance with the present invention. In this figure, solid lines illustrate the wrapping apparatus in a closed position and phantom lines show the wrapping apparatus in an open position.

FIG. 2 is a top plan view of the wrapping apparatus of FIG. 1 in the open position.

FIG. 3 is a sectional view of the wrapping apparatus of FIG. 2 taken along the lines 3—3 of FIG. 2. The thicknesses of the springable base and the wrapping material are exaggerated for purposes of illustration.

FIG. 4 is the same view as FIG. 3, but showing the wrapping apparatus in the closed position. The phantom lines illustrate that the base may be convex, rather than flat, when the wrapping apparatus is in the closed position.

FIG. 8 is a top plan view of yet another embodiment of a wrapping apparatus constructed in accordance with the present invention. The wrapping apparatus is shown in the open position.

FIG. 9 is a sectional view of the wrapping apparatus of FIG. 8 taken along the lines 9—9 of FIG. 8. The thicknesses of the springable base and the wrapping material are exaggerated for purposes of illustration.

FIG. 10 is the same view as FIG. 9, but shows the wrapping apparatus in the closed position.

FIG. 11 is a perspective view of still another embodiment of a wrapping apparatus constructed in accordance with the present invention. Solid lines show the wrapping apparatus in a closed position and phantom lines illustrate the apparatus in an open position.

FIG. 12 is a cross-sectional view of one of the arms and a portion of wrapping material of a wrapping apparatus wherein the arms are imbedded between two layers of wrapping material.

FIG. 13 is a partly sectional view of a wrapping apparatus in the open position with a floral grouping being placed therein. The thicknesses of the springable base and wrapping material are exonerated for purposes of illustration.

FIG. 14 is same view as FIG. 13, but shows the wrapping apparatus in the closed position with the floral grouping wrapped therein.

DETAILED DESCRIPTION OF THE PREFERRED EMBODIMENTS

Figure 5:
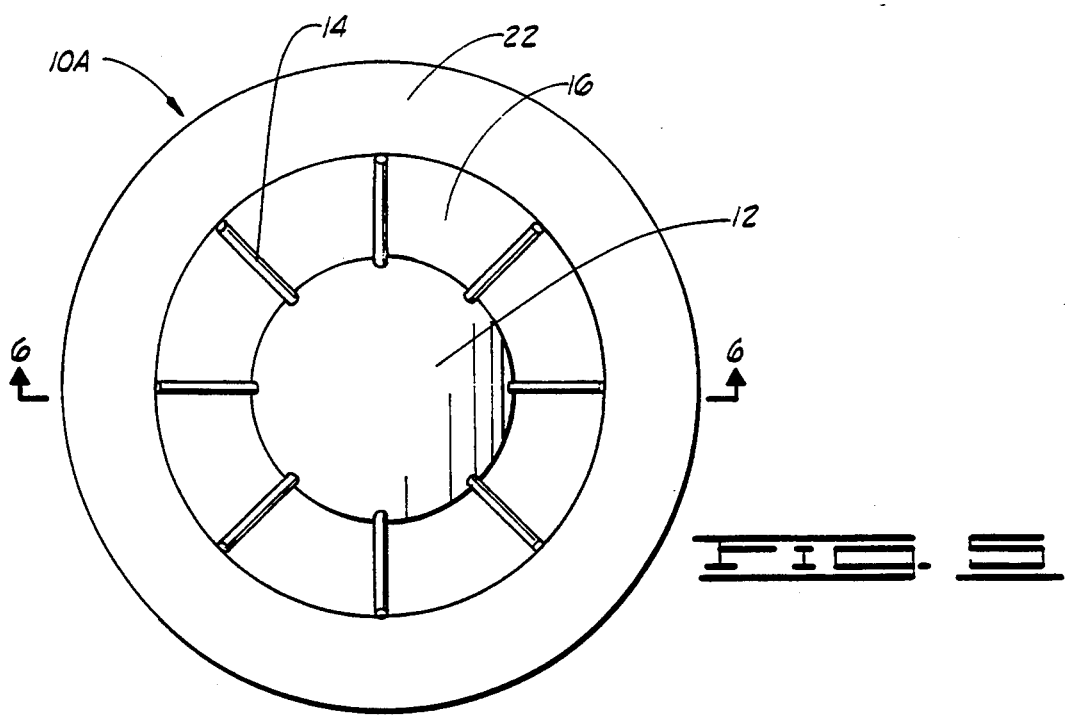
FIG. 5 is a top plan view of another embodiment of a wrapping apparatus constructed in accordance with the present invention. The wrapping apparatus is shown in the open position.

Referring to the drawings in general, and to FIG. 1 in particular, shown therein and designated by the general reference numeral 10 is a wrapping apparatus, which includes a springable base 12, a plurality of arms 14 and a wrapping material 16. As indicated by direction arrows 18, the wrapping apparatus 10 is adapted to assume an open position (illustrated by phantom lines) or a closed position (shown in solid lines).

As shown in FIG. 2, the springable base 12 is typically circular in shape. It should be appreciated, however, that the springable base 12 may be constructed in a wide variety of shapes.

The springable base 12 may be made of metal, plastic or any substance which can assume shapes consistent with the purposes described herein. In general, the base 12 should be thin and have both flexibility and rigidity in order to be springable.

One end of each arm 14 is secured to the upper surface 15 of the springable base 12 at a point toward the outer perimeter of the springable base 12. Typically, the arms 14 are uniformly spaced and extend angularly outward and upward from the springable base 12.

The arms 14 may be made of wood, plastic, metal or any other substance having sufficient rigidity and structural strength to support the particular wrapping material 16 used. The arms 14 should also be light enough in weight to be moved inward by the springing movement of the base 12. Any number of arms 14 may be employed as long as there are an adequate number of arms 14 to control the wrapping material 16.

The arms 14 may be rod-like or may have one of a wide variety of shapes. For example, the arms 14 may be elongated loops in order to produce a decorative appearance.

The wrapping material 16 is constructed from any suitable material that is capable of being wrapped about an item as described herein. Preferably, the wrapping material 16 comprises paper (untreated or treated in any manner), cellophane, foil, man-made organic polymer film or combinations thereof.

The term "man-made organic polymer film" means a man-made resin such as a polypropylene as opposed to naturally occurring resins such as cellophane.

A man-made organic polymer film is relatively strong and not subject to tearing (substantially non-tearable), as might be the case with paper or foil. The man-made organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral grouping.

Additionally, a relatively thin film of substantially linearly linked processed organic polymer does not substantially deteriorate in sunlight. Processed organic polymer films having carbon atoms both linearly linked and cross linked, and some cross linked polymer films, also may be suitable for use in the present invention, provided such films are substantially flexible and can be made in a sheet-like format for wrapping purposes consistent with the present invention. For example, one man-made organic polymer film is a polypropylene film.

Referring to FIG. 3, shown therein is the wrapping apparatus 10 in the open position. It should be appreciated that, in FIG. 3 and in the other sectional views of the drawing figures, the thicknesses of the springable base 12 and the wrapping material 16 are exaggerated for purposes of illustration.

The springable base 12 is in an arched posture wherein the central area 19 of the springable base 12 is displaced upward from the perimeter areas 20 of the springable base 12. In other words, the springable base 12 is concave, or rounded inward. It should be appreciated that the arched posture of the springable base 12 has the effect of spreading the arms 14 and the wrapping material 16 outward.

With reference to FIG. 4, shown therein is the wrapping apparatus 10 in the closed position. The base 12 is sprung into the substantially flat position. As the base 12 springs into the flat, the arms 14 are tilted inward into a tighter arrangement and draw the wrapping material 16 inward as well.

Instead of being substantially flat, the springable base 12 may be convex, or rounded outward, after being sprung. The convex shape of the springable base 12 is illustrated by phantom lines in FIG. 4. In either the flat or convex shape, however, the springable base 12 tilts the arms 14 inward to gather in the wrapping material 16.

Figure 6:
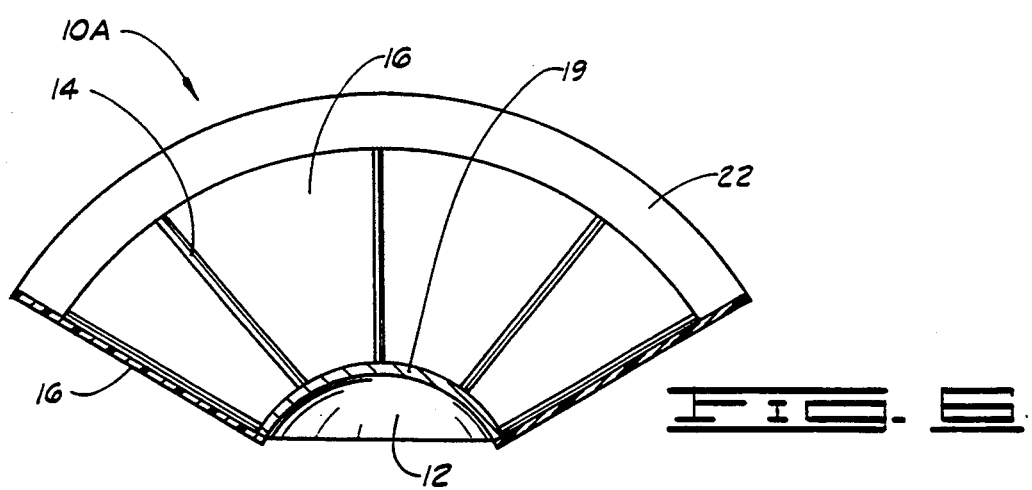
FIG. 6 is a sectional view of the wrapping apparatus of FIG. 5 taken along the lines 6—6 of FIG. 5. The thicknesses of the springable base and the wrapping material are exaggerated for purposes of illustration.
Figure 7:
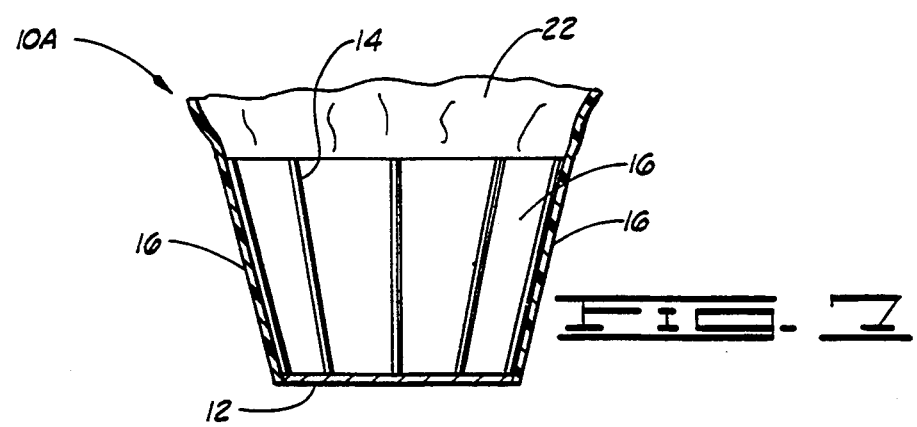
FIG. 7 is the same view as FIG. 6, but shows the wrapping apparatus in the closed position.

Turning to FIGS. 5 through 7, shown therein and designated by reference character 10A is another embodiment of a wrapping apparatus constructed in accordance with the present invention. The wrapping apparatus 10A is like the wrapping apparatus 10, except that the wrapping material 16 extends beyond the arms 14 to define an upper skirt area 22.

It should be appreciated that the skirt area 22 is unsupported by the arms 14. When the wrapping apparatus 10A is in the open position, as shown in FIG. 6, the skirt area 22 is substantially spread out even though unsupported by the arms 14. As illustrated by FIG. 7, the skirt area 22 is loosely ruffled when the wrapping apparatus 10A is in the closed position.

Referring to FIGS. 8 through 10, shown therein and designated by reference character 10B is yet another embodiment of a wrapping apparatus constructed in accordance with the present invention. The wrapping apparatus 10B includes an upper skirt area 22 which is supported by arms 14B.

The arms 14B are exactly like the arms 14 described hereinabove, except that the arms 14B extend substantially to the outer edge of the skirt area 22 and have an outwardly bent end portion 24. The skirt area 22 is secured to the bent end portion 24 of the arms 14B in any suitable manner.

As illustrated by FIGS. 9 and 10, the wrapping material 16 may be a continuous sheet of material which extends under the springable base 12. When the wrapping apparatus 10B is in the open position, as shown in FIG. 9, the springable base 12 is arched over the bottom 26 of the wrapping material 16. The springable base 12 is substantially flat and against the bottom 26 of the wrapping material 16 when the wrapping apparatus 10B is in the closed position, as illustrated by FIG. 10.

With reference to FIG. 11, shown therein and designated by reference character 10C is another embodiment of a wrapping apparatus constructed in accordance with the present invention. The wrapping apparatus 10C is exactly like the wrapping apparatus 10 described hereinabove, except that the arms 14C are on the outside, rather than the inside, of the wrapping material 16.

It should be appreciated that the wrapping apparatus 10C has the springable base 12 which tilts the arms 14C inward when springing from the arched posture to the flat posture. It should also be appreciated that the arms 14 and 14B of the previously described embodiments 10A and 10B, respectively, may be placed on the outside of the wrapping material 16.

With reference to FIG. 12, shown therein and designated by reference numeral 14D is an arm disposed between two layers 28 and 30 of wrapping material 16. The two layers 28 and 30 may be secured to the arm 14 and to one another in any suitable manner, such as with adhesive, by lamination or by heat-sealing. The construction illustrated by FIG. 12 is an alternative to locating the arms 14 on the inside or the outside of the wrapping material 16. It should be appreciated that the construction shown in FIG. 12 may be utilized with any of the embodiments described hereinabove.

Operation

Referring now to FIGS. 13 and 14, shown therein is a method of wrapping a floral grouping 32 in the wrapping apparatus 10A. The floral grouping 32 typically comprises a floral arrangement 34 planted in a flower pot 36. It should be appreciated that the same method is used to wrap an object in the embodiments 10, 10B and 10C of the wrapping apparatus.

As illustrated by FIG. 13, the wrapping apparatus 10A is first in the open position to receive the floral grouping 32. The springable base 12 is in the arched posture to tilt the arms 14 outward and spread the wrapping material 16.

The floral grouping 32 is substantially centered over the springable base 12 and is lowered onto the springable base 12, as indicated by direction arrows 38. As mentioned hereinabove, pressure on the upper surface of the springable base 12 causes the base 12 to snap from the arched posture to the flat posture. The weight of the floral grouping 32 typically exerts sufficient pressure on the springable base 12 to cause the base 12 to snap into the flat posture. If not, external pressure in the direction of arrows 38 may be applied to the flower pot 36 to spring the base 12.

The snapping of the springable base 12 from the arched posture to the flat posture closes the wrapping apparatus 10A around the floral grouping 32, as illustrated by FIG. 14. In the closed position, the arms 14 are tilted inward by the base 12 to the flower pot 36. The wrapping material 16 is drawn toward the floral grouping 32 by the arms 14.

As illustrated by FIGS. 13 and 14, the wrapping apparatus 10 virtually wraps itself around the floral grouping. By merely placing the floral grouping 32 upon the springable base 12, the wrapping material 16 is drawn up around the flower pot 36.

The wrapping apparatus 10A may be returned to the open position by pushing upward on the middle of the springable base 12 until the springable base 12 assumes the arched or concaved posture. In this manner, the wrapping apparatus 10A may be easily removed from one floral grouping and is ready to be utilized with another floral grouping.

For purposes of illustration, FIGS. 13 and 14 show a floral grouping 32 being wrapped in the wrapping apparatus 10. It should be appreciated that a wide variety of items other than floral groupings may be wrapped in the wrapping apparatus 10 and in variations thereof which would be obvious to one familiar with the art. For example, the wrapping apparatus 10 may be provided with curved arms 14 which draw wrapping material around a substantially spherical object, such as the root ball of a plant.

Changes may be made in the combinations, operations and arrangements of the various parts and elements described herein without departing from the spirit and scope of the invention as defined in the following claims.

What is claimed is:

1. An apparatus for wrapping an item selected from a group of items consisting of a flower pot having an outer peripheral surface and a floral grouping comprising:
    a wrapping material comprising a sheet of material sized and shaped to be wrapped about at least a portion of the item;
    a springable base having an upper surface with a central area and a perimeter area, said base being biased to sustain itself in either an arched configuration or a substantially flat configuration, wherein said springable base flexibly springs from the arched configuration into the flat configuration in response to pressure on the central area of the base; and
    a plurality of arms connected to and extending from the perimeter area of said springable base, said arms being in an open position to receive said item when said base is in the arched configuration and said arms being in a closed position to wrap at least a portion of said item when said springable base is in the flat configuration, said sheet of material connected to said arms for movement with said arms;
    wherein said plurality of arms and said sheet of material cooperate to move said sheet of material around at least a portion of said item when said item is disposed on said springable base, said springable base snapping from the arched configuration into the flat configuration in response to pressure on the central area of said base by said item, said plurality of arms simultaneously snapping to a closed position from an open position in response to the flat configuration of the base, said sheet of material extending about at least a portion of said item thereby wrapping at least a portion of said item.

2. The apparatus of claim 1 wherein said wrapping material extends under said base.

3. The apparatus of claim 1 wherein said wrapping material has an upper skirt area and each one of said arms has an outwardly bent end portion supporting the skirt area of said wrapping material.

4. The apparatus of claim 1 wherein said wrapping material extends beyond said arms to define a skirt area of said wrapping material.

5. The apparatus of claim 4 wherein said wrapping material extends under said base.

6. An apparatus for wrapping an item selected from a group of items consisting of a flower pot having an outer peripheral surface and a floral grouping comprising:
    a wrapping material comprising a sheet of material sized and shaped to be wrapped about at least a portion of the item;
    a springable base having an upper surface with a central area and a perimeter area, said base being biased to sustain itself in either a concave configuration or a convex configuration, wherein said springable base flexibly springs from the concave configuration into the convex configuration in response to pressure on the central area of the base; and a plurality of arms connected to and extending from the perimeter area of said springable base, said arms being in an open position to receive said item when said base is in the concave configuration and said arms being in a closed position to wrap at least a portion of said item when said springable base is in the convex configuration, said sheet of material connected to said arms for movement with said arms;

wherein said plurality of arms and said sheet of material cooperate to move said sheet of material around at least a portion of said item when said item is disposed on said springable base, said springable base snapping from the concave configuration into the convex configuration in response to pressure on the central area of said base by said item, said plurality of arms simultaneously snapping to a closed position from an open position in response to the convex configuration of the base, said sheet of material extending about at least a portion of said item thereby wrapping at least a portion of said item.

7. The apparatus of claim 6 wherein said wrapping material extends under said base.

8. The apparatus of claim 6 wherein said wrapping material has an upper skirt area and each one of said arms has an outwardly bent end portion supporting the skirt area of said wrapping material.

9. The apparatus of claim 6 wherein said wrapping material extends beyond said arms to define a skirt area of said wrapping material.

10. The apparatus of claim 9 wherein said wrapping material extends under said base.

11. An apparatus for wrapping an item selected from a group of items consisting of a flower pot having an outer peripheral surface and a floral grouping comprising:

a springable base having an upper surface with a central area and a perimeter area, said base being biased to sustain itself in either an arched configuration or a substantially flat configuration, wherein said springable base flexibly springs from the arched configuration into the flat configuration in response to pressure on the central area of the base;

a plurality of arms connected to and extending from the perimeter area of said springable base, said arms being in an open position to receive said item when said base is in the arched configuration and said arms being in a closed position to wrap at least a portion of said item when said springable base is in the flat configuration; and a wrapping material comprising a first sheet of material and a second sheet of material, both first sheet of material and second sheet of material sized and shaped to be wrapped about at least a portion of the item, said first sheet of material extending inside said arms and said second sheet of material extending outside said arms, said first sheet of material and second sheet of material being secured together between said arms to be moveable with said arms;

wherein said plurality of arms and said wrapping material cooperate to move said wrapping material around at least a portion of said item when said item is disposed on said springable base, said springable base snapping from the arched configuration into the flat configuration in response to pressure on the central area of said base by said item, said plurality of arms simultaneously snapping to a closed position from an open position in response to the flat configuration of the base, said wrapping material extending about at least a portion of said item thereby wrapping at least a portion of said item.

12. The apparatus of claim 11 wherein said wrapping material extends under said base.

13. The apparatus of claim 11 wherein said wrapping material has an upper skirt area and each one of said arms has an outwardly bent end portion supporting the skirt area of said wrapping material.

14. The apparatus of claim 11 wherein said wrapping material extends beyond said arms to define a skirt area of said wrapping material.

15. The apparatus of claim 14 wherein said wrapping material extends under said base.

16. An apparatus for wrapping an item selected from a group of items consisting of a flower pot having an outer peripheral surface and a floral grouping comprising:

a wrapping material comprising a sheet of material sized and shaped to be wrapped about at least a portion of the item;

a springable base having an upper surface with a central area and a perimeter area; and a plurality of arms connected to and extending from the perimeter area of said springable base, said sheet of material connected to said arms for movement with said arms;

wherein said base moves said plurality of arms from an open position to receive a item to a closed position to wrap at least a portion of said item in response to pressure on the central area of said base when said item is disposed thereupon.

17. The apparatus of claim 16 wherein said wrapping material extends under said base.

18. The apparatus of claim 16 wherein said wrapping material has an upper skirt area and each one of said arms has an outwardly bent end portion supporting the skirt area of said wrapping material.

19. The apparatus of claim 16 wherein said wrapping material extends beyond said arms to define a skirt area of said wrapping material.

20. The apparatus of claim 19 wherein said wrapping material extends under said base.

* * * * *

UNITED STATES PATENT AND TRADEMARK OFFICE
CERTIFICATE OF CORRECTION

PATENT NO. : 5,412,906
DATED : May 9, 1995
INVENTOR(S) : Weder

It is certified that error appears in the above-identified patent and that said Letters Patent is hereby corrected as shown below:

Column 2, line 58, please delete "exonerated" and substitute therefor -- exaggerated --.

Column 3, lines 15-16, please delete "upper surface 15" and substitute therefor -- upper surface --.

Column 4, line 14, after "flat" please insert -- position --.

Column 4, line 56, please delete "bottom 26" and substitute therefor -- bottom --.

Signed and Sealed this

Seventeenth Day of October, 1995

BRUCE LEHMAN

*Attest:*

*Attesting Officer*       *Commissioner of Patents and Trademarks*